United States Patent [19]
Martone et al.

[11] 3,718,833
[45] Feb. 27, 1973

[54] SCINTILLATION CAMERA SYSTEM

[75] Inventors: Ronald J. Martone, Cheshire; Peter G. Mueller, Guilford; Homer M. Bailey, North Haven, all of Conn.

[73] Assignee: Picker Corporation, White Plains, N.Y.

[22] Filed: June 18, 1969

[21] Appl. No.: 834,478

[52] U.S. Cl......................................315/18, 315/11
[51] Int. Cl..............................................H01j 29/70
[58] Field of Search...........................315/18, 10, 11

[56] References Cited

UNITED STATES PATENTS

| | | | |
|---|---|---|---|
| 2,974,254 | 3/1961 | Fitzmaurice et al. | 315/18 X |
| 3,440,480 | 4/1969 | Henderson | 315/18 |
| 3,532,927 | 10/1970 | Hindel | 315/18 |

OTHER PUBLICATIONS

Ett, Elimination of Banding in Digital Image Recording, 3-1969, p. 1195
Supernowicz, Half Tone Generation, 9-1969, p. 567

Primary Examiner—Rodney D. Bennett, Jr.
Assistant Examiner—Brian L. Ribando
Attorney—Watts, Hoffmann, Fisher and Heinke

[57] ABSTRACT

A scintillation camera system includes an oscilloscope for producing visible indications at discrete, separate positions on a screen of a cathode ray tube in response to scintillations at corresponding locations in a scintillator. The oscilloscope includes an electron gun and beam deflecting elements which direct an electron beam to particular positions on the screen in response to scintillations. Circuitry is providing for diffusing the individual visible indications on the screen thereby reducing separations between these positions.

13 Claims, 5 Drawing Figures

INVENTORS
RONALD J. MARTONE
PETER G. MUELLER
HOMER M. BAILEY
BY Watts, Hoffmann,
Fisher & Heinke
ATTORNEYS.

SCINTILLATION CAMERA SYSTEM

REFERENCED PATENTS AND PATENT APPLICATIONS

U. S. Pat. application, Ser. No. 739,793, filed June 25, 1968 by Peter G. Mueller, for "Pulse Height Analyzer."

U. S. Pat. application, Ser. No. 739,889, filed June 25, 1968 by Robert Hindel, for "Scintillation Detector Indicating System".

BACKGROUND OF THE INVENTION

1. Field of the Invention

The present invention relates to circuitry for improving the quality of images produced by scintillation camera systems.

2. The Prior Art

In the diagnosis of certain illnesses, radioactive isotopes are administered to patients. Many administered isotopes have the characteristic of concentrating in certain types of tissue and either not concentrating in, or concentrating to a lesser degree, in other types of tissue. For example, iodine 131 collects in thyroid glands. The graphic image produced to show the spacial distribution and concentration of this isotope in the thyroid gland provides an image of the thyroid gland itself. This image is useful in diagnosing a patient's physical condition.

Devices used for producing graphic images of the distribution of an isotope in a subject are known as scanners and cameras. Cameras remain stationary with respect to the patient as the graphic image of the spacial distribution of an isotope is developed. Many cameras include a relatively large disc-like scintillation crystal positioned to be bombarded by radiation emitted by a patient. The scintillation crystal produces light energy in response to bombardment by high energy electromagnetic radiation, such as gamma rays. This light energy is in the form of flashes or scintillations.

Photo responsive circuitry is generally associated with the scintillator crystal for producing an electrical signal indicating the intensity and location of a given scintillation in the crystal. Generally, such circuitry includes a plurality of phototubes which are positioned near the crystal and which produce signals proportional to the intensity of a scintillation and inversely proportional to its distance from a given phototube. Typically, collimators are placed between the crystals and the radiation source.

A given scintillation in the crystal results in a number of simultaneous output signals from the phototubes. These signals are amplified and processed by electrical circuitry which is in turn connected to a cathode ray tube (CRT) of an oscilloscope. Preferred circuitry for processing such signals is described in greater detail in the referenced applications; however, briefly, such circuitry includes summing and ratio circuits which determine the location of a given scintillation along the X- and Y-axes of an arbitrarily chosen coordinate system on the scintillator crystal. The electrical information concerning the locations of scintillations on the crystal is digitized and then reconverted to analog output signals. The analog output is applied to horizontal and vertical deflection elements of the CRT.

This circuitry also determines whether a detected scintillation has resulted from radiation within a desired range of energy levels. The circuitry blanks the CRT when detected radiation is outside the desired energy level range. If a given scintillation is within a desired range of intensity, the pulse-height analyzer circuitry causes the CRT to direct an electron beam to the screen of the tube. The beam is deflected in proportion to the output signals of the X- and Y-axes summing and ratio circuits. An illuminated point or spot on the screen of the CRT is thus produced at a location on the tube which corresponds to the location of the scintillation in the scintillator crystal. Generally the beam is blanked at high frequency intervals as it is directed to the screen at a given location so that an illuminated spot on the screen is actually caused by a succession of unblanked beams impinging on the screen.

Some prior art scintillation camera systems have been of the "analog" type and certain problems have been encountered in properly locating scintillations of differing intensities. One solution is illustrated and described in copending U. S. Pat. application, Ser. No. 739,889 filed June 25, 1968 by Robert Hindel and now U.S. Pat. No. 3,532,927. In the "digital" type cameras, the information concerning the location of scintillations is digitized and then reconverted into analog signals as noted, so that the locations of scintillations having differing intensities is relatively accurately reproduced. However, in digital systems, since it is practicable to use only a limited number of channels, the number of possible locations of illuminated locations on a CRT is finite. For example, in a scintillation camera system, known commercially as the "-Dynacamera," manufactured by Picker Corporation, Cleveland, Ohio, 7850 such illuminated locations are possible.

The images created on the screen of the CRT in these last-mentioned systems are sometimes referred to as "rasters" because the image produced on the screen is somewhat similar in appearance to a television picture. However, the term "raster" connotes an image created by a sweeping beam such as that of a television picture tube and hence this is not, strictly speaking, applicable to the image created upon the CRT of a digital scintillation camera system.

The image created by the CRT of such a system is a result of the electron beam being deflected from location to location on the screen in response to scintillations at corresponding locations in the scintillator crystal. The beam is blanked as the deflection signals to the elements are altered so that the beam does not leave a trace on the screen.

Because of the limited number of possible illuminated locations on the screen, the image has had a grid-like appearance, similar to a halftone newspaper picture, due to the discrete, separate illuminated locations on the screen. These images, although quite acceptable for many diagnostic purposes, have in the past, lacked a certain degree of definition due to their grid-like appearance.

In addition to producing images on oscilloscope screens, systems of the type referred to have also performed other types of data processing functions which have required that the analog output signals from the data processing circuitry be redigitized. When the analog information is redigitized the end product of these data processing operations has been found to be less than optimum as a result of the redigitizing operation.

The present invention provides a smoothing circuit for superimposing cyclic, nonharmonic waveforms on analog signals which have been reconverted from digitized information for the purpose of improving the quality of images or data produced by the system.

The present invention further provides a scintillation camera system in which an image produced on the screen of a CRT is characterized by being formed by a number of diffused illuminated locations or spots whereby separation between adjacent illuminated locations is reduced to produce a substantially continuous, shaded image of greatly improved quality. This image approaches the appearance of a continuous tone black and white photograph.

SUMMARY OF THE INVENTION

The present invention provides a new and improved scintillation camera system including scintillation camera circuitry for processing electrical information pertaining to the location and intensity of scintillations in the camera. This circuitry is effective to digitize signals from the camera and to reconvert the digitized information to analog signals. Smoothing circuit means is provided for superimposing cyclic, nonharmonic waveforms on the analog signals to improve the quality of the CRT images or other data produced by the system, for producing images on the screen of a CRT or for further data processing operations. The smoothing circuit means effects relatively slight deflections of the CRT beam independently of sensed scintillations. This causes the beam to produce a spot on the screen comprised of a number of illuminated dots scattered about the location to which the beam would otherwise be consistently directed. It is to be pointed out that in a preferred construction, the slight beam deflections caused by the smoothing circuit occur at a frequency which is low compared to the blanking frequency of the beam, thus producing the individual illuminated dots referred to. A spot or collective dot thus produced is somewhat diffuse, being brightest at the center and with the intensity of the illumination diminishing as a function of the radial distance from the center.

When such smoothing circuitry is utilized in connection with a scintillation camera system of the character described, the image of an organ or the like under study is composed of diffuse individual spots on the screen giving the appearance of a shaded, nearly coherent or continuous image.

The smoothing circuit means includes X- and Y-axes outputs which are coupled to the X- and Y-axes circuitry of the system. Output waveforms from the smoothing circuit are superimposed on the voltage applied to respective ones of the CRT deflection elements. The voltage applied to the beam deflection elements thus varies according to the output voltage waveform of the smoothing circuit means.

Preferably, the smoothing circuit means includes two circuits which independently produce similar output waveforms. The output of one circuit is applied to the X-axis beam deflector, and the output of the other circuit is applied to the Y-axis beam deflector.

Each circuit includes a voltage-responsive wave shaping circuit for producing cyclic voltage waveforms having positive-going and negative-going peaks separated by ramp portions having relatively constant slopes. This waveform is amplified and applied to respective beam deflection means in the CRT.

The ramp portions of the waveforms are of substantially longer duration than the peaks so that the distribution of dots at a given location on the screen is characterized by being dense adjacent the center of the location and increasingly sparse proceeding radially from the center. This distribution of dots follows a Gaussian or normal distribution curve and the illuminated spot, or collective dot is referred to as a Gaussian dot.

The smoothing circuits; while having substantially the same circuit configurations, produce waveforms at the outputs of each of these circuits which are out of synchronism with each other and are nonharmonic. Preferably, the frequency of one smoothing circuit is adjustable relative to the frequency of the other to a limited extent. The amplitudes of these waveforms are also adjustable to vary the diameter of the spot on the screen.

In a preferred embodiment, the amplitude of the output waveforms of the smoothing circuitry can be varied in order to controllably change the continuity of the picture on the CRT screen.

Other objects and advantages of the present invention will become apparent from the following detailed description thereof made with reference to the accompanying drawings which form a part of the specification.

DESCRIPTION OF A PREFERRED EMBODIMENT

Figure 1:
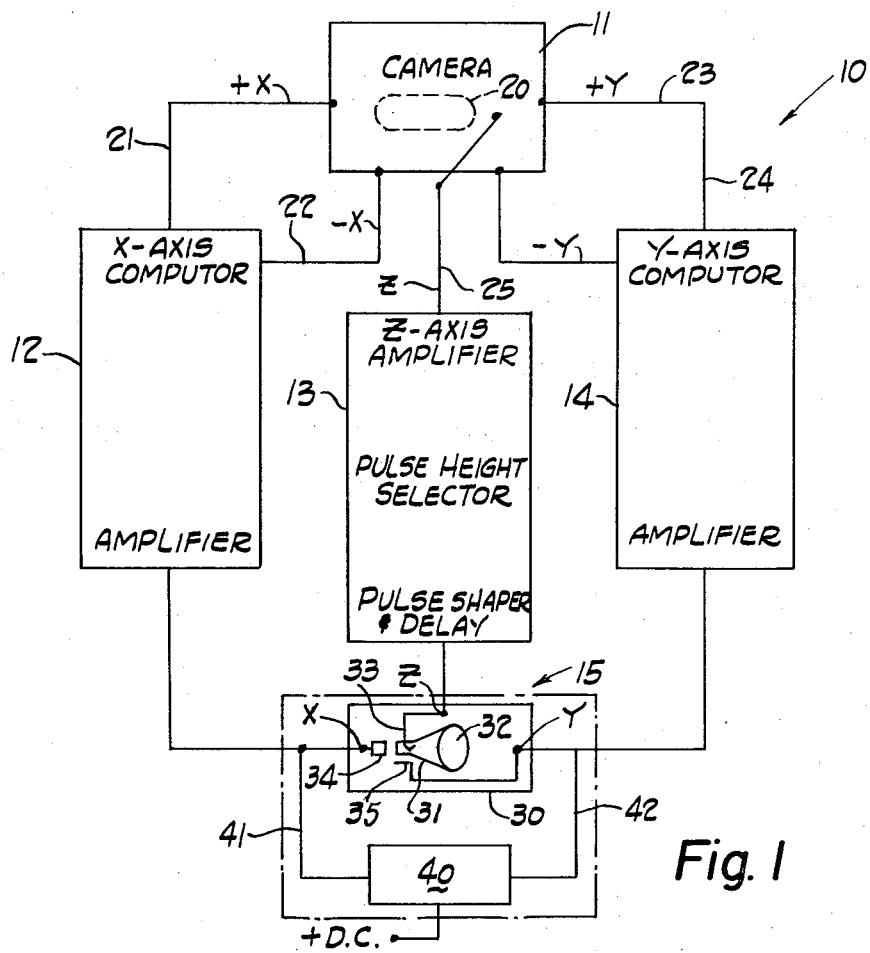
FIG. 1 is a schematic illustration of a scintillation camera system embodying the invention.

FIG. 1 shows a scintillation camera system 10 embodying the present invention which includes a camera 11 for determining the location and intensity of radiation in a given subject, signal processing units 12, 13, 14 which are coupled to the camera 11 for handling electrical output signals from the camera, and an oscilloscope unit 15 connected to the signal processing units 12, 13, 14 to provide a visual image of certain of the radiation detected by the camera 11.

The camera 11 includes a scintillator crystal 20 (schematically shown) which is arbitrarily divided into quadrants defined by X- and Y-axes. A plurality of phototubes is stationed adjacent the scintillation crystal for generating electrical signals in response to the location and intensity of scintillations in the crystal caused by radiation impinging on the crystal material. The camera 11 includes X-axis outputs 21, 22, Y-axis outputs 23, 24 and a Z-axis output 25. The Z-axis output signal corresponds to the intensity of a given scintillation detected by the camera. The generation of signals by phototubes in a camera of the type referred to is illustrated and described in Anger, "Scintillation Camera," *Review of Scientific Instruments*, January 1958, pg. 27.

The signal processing unit 12 is coupled to the X-axis outputs of the camera 11 and is effective to digitize the analog information received from the camera and then reconvert the digitized information to an analog signal. The reconverted analog signals are applied to the X-axis input of the oscilloscope. The Y-axis signal processing unit 14 is substantially identical to the unit 12 and accordingly produces amplified reconverted analog output signals to the Y-input of the oscilloscope 15 in response to detected scintillations in the camera 11.

Because the computers digitize the electrical data transmitted to the units 12, 14 from the camera, the analog beam deflection signals which are transmitted to the X- and Y-inputs of the oscilloscope 15 tend to have distinct signal levels, due to the finite number of channels in the units 12, 14.

The unit 13 defines a scintillation "window" and produces output signals according to the detected intensity of certain scintillations. Scintillations having intensities greater than a given high level, or lower than a given low level are discarded, i.e., the electron beam remains blanked in response to these signals. Scintillations having intensities between the upper and lower levels produce output signals which are transmitted to the Z-input of the oscilloscope 15 to unblank the beam. Accordingly, the unit 13 includes a Z-axis amplifier, a pulse height selector, and a pulse shaper and delay arrangement. Functional and constructional details of a unit similar to the unit 13 are found in the referenced U.S. Pat. application, Ser. No. 739,793.

The oscilloscope unit 15 includes an oscilloscope 30 which, for purposes of description, is an electrostatic oscilloscope. It should be understood that an electromagnetic oscilloscope may be used. The oscilloscope 30 includes a cathode ray tube (CRT) 31 having a screen 32; an electron gun schematically illustrated at 33, and X- and Y-deflection plates schematically shown at 34, 35. The gun 33 is connected to the unit 13 so that when a scintillation having an intensity within a given range occurs in the scintillator, the unit 13 produces an output signal which is transmitted to the gun 33 for unblanking the electron beam as noted.

During the period in which the unit 13 unblanks the beam, the beam is interrupted periodically so that any given illuminated location on the screen is produced by an intermittent beam. This periodic blanking of the beam may occur, e.g., for 2 microseconds every 30 microseconds.

The location of the illuminated spot on the screen 32 is determined by the signals on the deflection plates 34, 35. A scintillation having an intensity within the desired range is detected at the camera 11 and information concerning its location along the X- and Y-axes of the crystal 20 is transmitted to the units 12, 14 which provide deflection signals to the plates 34, 35. After the plates are conditioned to direct the beam, the beam is unblanked by the Z-axis unit and directed to a discrete location on the screen 32.

The beam is then blanked and a succeeding scintillation in the crystal 20 produces deflecting signals at the plates 34, 35. The beam is again unblanked to produce an illuminated spot at another discrete location on the screen 32. Thus the electron beam impinges upon the screen at various locations depending upon the locations of scintillations of the crystal 20. Accordingly, an image of the area under investigation, composed of a series of distinct, separate illuminated spots on the screen 32, is produced. Because of the nature of the reconverted analog signals from the units 12, 14, the image produced on the screen 32 is not continuous but rather tends to have a grid-like appearance due to these separate, distinct illuminated spots.

The illustrated oscilloscope unit 15 further includes smoothing circuit means 40 for diminishing the grid-like effect of the image on the screen 32. The smoothing circuit means 40 diffuses individual spots on the screen to produce a substantially coherent shaded image. As seen in FIG. 1, the smoothing circuit means 40 includes outputs 41, 42 connected to the X- and Y-inputs, respectively, of the oscilloscope. The outputs of the smoothing circuitry superimpose a cyclically varying waveform on the deflection signals from the units 12, 14, respectively. These waveforms are independent of scintillations which may be detected by the camera 11 and hence result in slight deflections of the electron beam as it is being trained at a particular location on the screen 32.

In the preferred system, the frequency of the cyclic waveform produced by the smoothing circuit means is low as compared to the frequency at which the beam is blanked as it is being directed to a particular location on the screen. Hence, the illuminated spot on the screen is composed of a series of dots and the spot, or collective dot, is diffuse. Because the spot created on the screen is diffused slightly, the size of individual spots created on the screen are larger than they would otherwise be and the continuity of the image created on the screen is considerably improved.

In addition to being associated with an oscilloscope, the units 12, 14 may cooperate with data processing equipment (not shown) utilized to produce different types of information concerning the radiation detected by the camera. In some circumstances, this data processing equipment must redigitize the signals from the signal processing units and in this connection it has been found that the waveforms superimposed on the analog signals produced by these units are necessary in order to operate the data processing equipment with optimum results.

Figure 2:
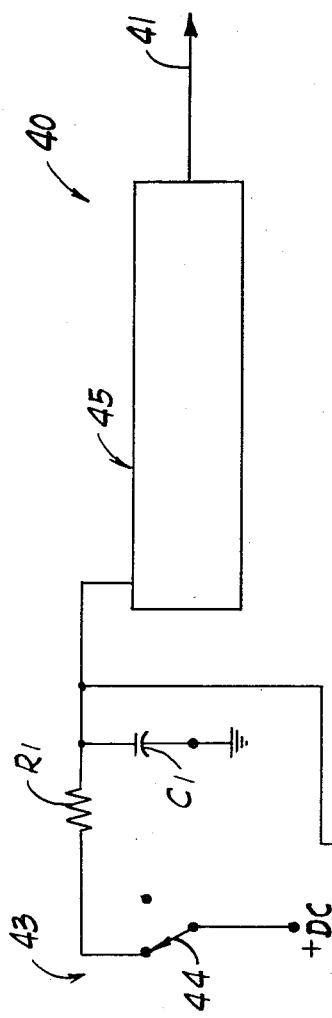
FIG. 2 shows smoothing circuitry forming a part of the system of FIG. 1.
Figure 2:
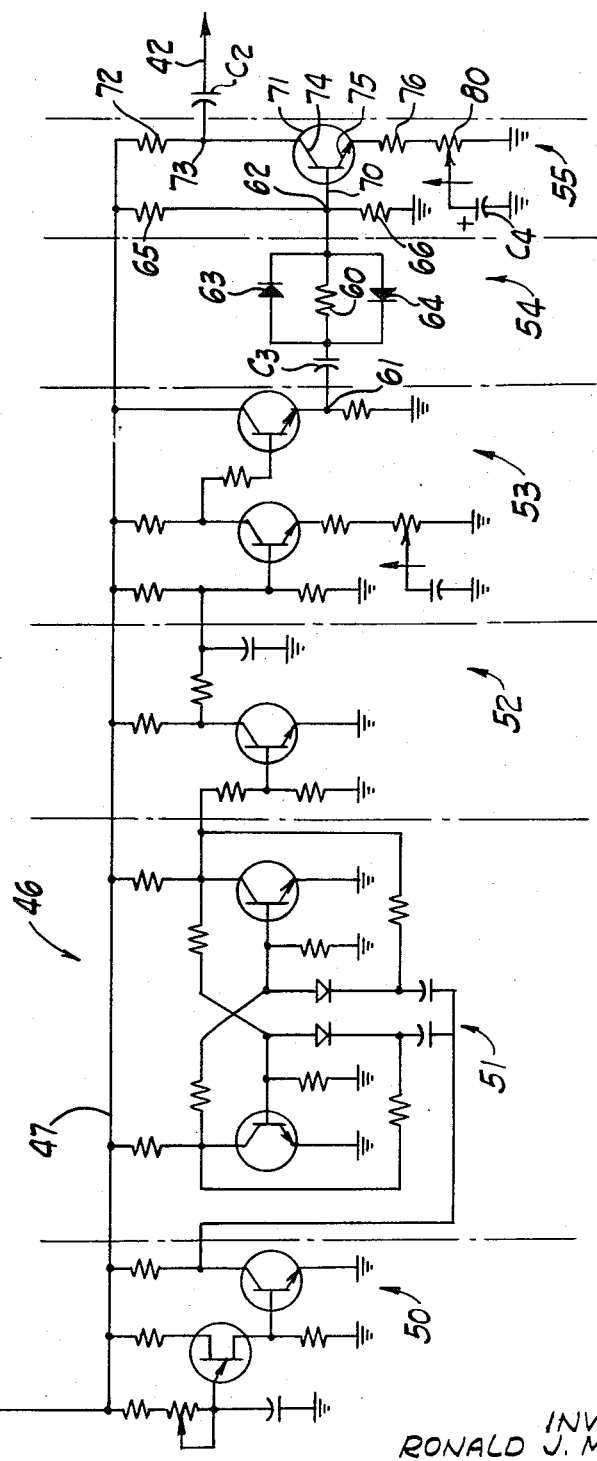

Referring now to FIG. 2, the smoothing circuitry 40 includes a power supply section 43 including a direct current power source (not shown), a control switch 44, a load resistor R1 and a filter capacitor C1. The power supply section 43 transmits D.C. power to first and second smoothing circuits 45, 46 which are connected between the power supply and the outputs 41, 42, respectively. The circuits 45, 46 generate output voltage waveforms which are superimposed on the X- and Y-deflection plates, respectively, of the CRT. While the outputs 41, 42 are schematically shown as connected to the X- and Y-inputs of the scope 30, it is apparent that these outputs can be connected into the X- and Y-circuitry at other suitable points for superimposition on the X- and Y-location signals, as is noted above. In a preferred construction, the organization and nominal values of all of the components of the circuit 45 are the same as those of the circuit 46. Therefore, only the circuit 46 is illustrated and described.

Figure 3:
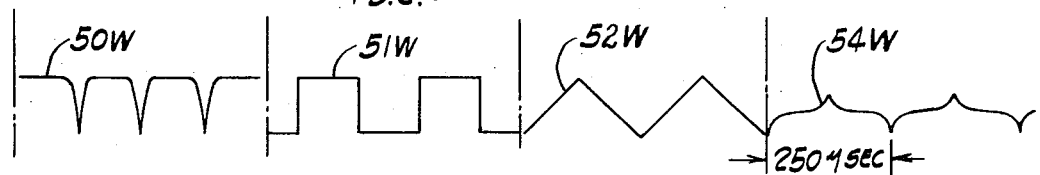
FIG. 3 shows wave forms produced by various sections of the smoothing circuitry.

The circuit 46 is connected to the power supply via a conductor 47 and includes an oscillator 50 connected to the power supply 43 for generating a series of negative-going pulses, (see FIG. 3, curve 50W). The output of the oscillator 50 is connected to a flip-flop or bi-stable multivibrator circuit 51. The flip-flop 51 produces a square wave output (FIG. 3, curve 51W). The square wave output from the flip-flop is transmitted to an integrator 52 which integrates the square wave to produce a sawtooth output wave form (FIG. 3, curve 52W). This sawtooth wave is amplified in a two stage amplifier 53 and applied across a voltage sensitive waveforming circuit 54.

The oscillator 50, flip-flop 51, integrator 52 and amplifier 53 are of conventional types and their operations are therefore not described in detail.

The waveforming circuit 54 transmits a cyclical wave (FIG. 3, curve 54W) to an output amplifier 55 which is coupled to the Y-deflection plate of the CRT through a coupling capacitor C2. The coupling capacitor C2 enables the output voltage waveform (FIG. 4, curve 55W) to be applied to the deflection plates of the CRT irrespective of the signal level maintained on the Y-deflection plate by the unit 14.

The waveforming circuit 54 transforms the sawtooth into a high frequency cyclic wave having a period of about 250 microseconds, and a shape or form to be described in greater detail presently. The wave forming circuit 54 includes a coupling capacitor C3 which is connected in series with a resistor 60 between an output junction 61 of the amplifier and a junction 62. Oppositely poled diodes 63, 64 are connected in parallel with the resistor 60. Resistors 65, 66 define a voltage divider between the power line 47 and ground and are effective to establish a D.C. reference level at the junction 62 to which the sawtooth wave is coupled by the capacitor C3. As the voltage level at the junction 61 increases relative to the voltage at the junction 62 the resistor 60 conducts resulting in a nearly linearly increasing voltage level at the junction 62. When the voltage across the resistor 60 rises to the forward threshold voltage of the diode 63, the diode 63 conducts to produce a rapidly positive-going voltage at the junction 62. The diode 63 continues to conduct as the sawtooth wave peaks and falls relative to the reference level, and this conduction of the diode provides a positive-going peak at the junction 62.

As the voltage at the junction 61 falls below the threshold voltage of the diode 63, the resistor 60 controls conduction again to produce a substantially linearly decreasing voltage level at the junction 62. This reduction of the voltage level at the junction 61 continues so that the voltage level at the junction 61 is negative with respect to the voltage level at the junction 62. When the voltage across the resistor 60 exceeds the forward threshold voltage of the diode 64, that diode is rendered conductive producing a rapidly negative-going voltage peak at the junction 62.

This voltage waveform is applied to the output section 55 for amplification. More particularly, the output voltage waveform produced at the junction 62 is impressed on the base 70 of the transistor 71. The transistor 71 is normally conductive and establishes a circuit from the power line 47 through a resistor 72, an output junction 73, the collector 74 and emitter 75 of the transistor 71, a resistor 76 and a potentiometer 80.

As previously noted, the voltage waveform at the junction 73 is coupled to the output line 42 through the coupling capacitor C2 permitting the voltage waveform at the junction 73 to be superimposed on the voltage level at the Y-deflection plate of the CRT regardless of the level of such voltage. This voltage waveform is illustrated in FIG. 4 as superimposed on the Y-axis voltage.

The gain of the output section 55 is controlled by adjustment of the potentiometer 80. For this purpose, the slider of the potentiometer is linked to a suitable manually operated knob (not shown). This knob enables the illuminated spots to be enlarged as desired by an operator of the system. The slider of the potentiometer is grounded through a capacitor C4.

Figure 4:
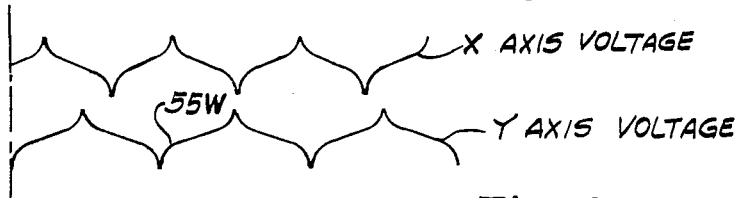
FIG. 4 compares the output voltage waveforms produced by separate smoothing circuits as applied to X- and Y-axes beam deflecting means in a CRT; and, FIG. 5 shows additional smoothing waveforms.

FIG. 4 illustrates the analog voltage applied to the respective X- and Y-axis inputs of the oscilloscope with the outputs of the smoothing circuitry superimposed. The voltage waveforms impressed on the X- and Y-deflection plates, while similarly shaped, are out of synchronism and are nonharmonic with respect to each other. This relationship between the output waveforms of the circuits 45, 46 can be achieved, for example, by adjustment of the frequency of the oscillator 50 of the circuit 46, to insure that the diffusion of any given spot on the oscilloscope screen is likely to be circumferentially uniform due to the nonsynchronous deflection signals produced by the smoothing circuit means.

From the foregoing, it should be appreciated that the output voltage waveform of each smoothing circuit is characterized by positive-going and negative-going voltage peaks which are separated by substantially linear ramp portions having positive and negative slopes. Each half cycle of these waveforms results in a series of dots being produced at a location on the CRT screen with the dots being distributed or scattered about the center of the location in a Gaussian or normal distribution. Thus the concentration of dots is greatest near the center of the location and is increasingly sparse proceeding away from the center. The collective dot, or spot, can therefore be thought of as a Gaussian spot. It should be understood that the particular curve 54W of FIG. 3 is produced as a result of the generation of the sawtooth wave configuration 52W of FIG. 3. However, the output waveform of the smoothing circuitry 46 could consist of cyclic waves corresponding, e.g., to one-half cycle of the waveform 54. Such a waveform is illustrated at 100 in FIG. 5, and is defined by positive-going and negative-going excursions or peaks, separated by a ramp portion.

Figure 5:

Further, a suitable output from the smoothing circuitry could be formed as shown by the curve 101, FIG. 5 in which a complete cycle of the wave is formed by waveforms which are nearly mirror images but have different periods. The exact shape of these output waveforms is determined by the input to the waveforming circuitry 54 and hence depends on the circuitry which is selected to produce such an input waveform. So long as the output of the smoothing circuitry provides positive-going and negative-going pulses or excursions and a sloping ramp portion between these peaks or excursions of the type referred to and illustrated, the illuminated spots on the CRT screen will be Gaussian spots.

It can now be seen that a new and improved apparatus has been provided and that the objects heretofore enumerated and others have been accomplished. While a preferred embodiment of the invention has been illustrated and described in detail, the invention is not to be considered limited to the precise construction shown.

What is claimed is:

1. In a scintillation camera system:
   a. means for converting analog signals produced by scintillations in a scintillator to digitized signals and thereafter reconverting said digitized signals to analog signals;
   b. an oscilloscope controlled by said reconverted analog signals to produce visible indications at discrete separate locations on a screen thereof in response to scintillations at corresponding locations in the scintillator;
   c. said oscilloscope including means for producing an electron beam, and beam deflection means for directing said beam to said locations in response to said reconverted analog signals; and,
   d. circuit means for enlarging the individual visible indications on said screen and reducing the separation between said locations.

2. A system as claimed in claim 1 wherein said beam deflection means is coupled to said system for directing said beam to a particular location on said screen in response to a corresponding scintillation occurring in said scintillator, said circuit means effecting relatively slight deflections of said beam independently of said scintillation whereby said beam is directed to locations closely adjacent said particular location.

3. A system as claimed in claim 1 wherein said system provides scintillation responsive beam deflecting signals to said beam deflection means for controlling the locations on said screen to which said beam is deflected, said circuit means providing cyclic beam deflecting signals to said deflection means whereby the effective amplitudes of said scintillation responsive beam deflecting signals are cyclically altered.

4. A system for producing an image on a screen of a cathode ray tube including:
   a. first means for intermittently establishing electron beams in the tube;
   b. deflection means for deflecting successive beams to various spaced locations on a screen of the tube;
   c. first circuitry for converting digitized signals to analog signals and applying said analog signals to said deflection means for conditioning said deflection means to deflect a beam to a particular location of a given number of locations on the screen prior to establishment of the beam and during the time said beam is established; and,
   d. second circuitry for conditioning said deflection means to cause said beam to impinge on said screen about said particular location to produce an illuminated spot on the screen which is relatively bright at its center and which is of diminishing intensity proceeding radially from said center.

5. In a scintillation camera system:
   a. a scintillation camera for producing first analog signals in response to detection of scintillations in a scintillator of the camera;
   b. signal processing circuitry for digitizing said first signals and reconverting said digitized signals to second analog signals; and,
   c. smoothing circuit means for superimposing cyclic, nonharmonic waveforms on said second analog signals.

6. In a scintillation camera system:
   a. an oscilloscope effective to produce visible indications at discrete separate locations on a screen thereof in response to scintillations at corresponding locations in a scintillator;
   b. said oscilloscope including means for producing an electron beam, and beam deflection means for directing said beam to said locations;
   c. scintillation responsive means providing beam deflecting signals to said beam deflection means for controlling the locations on said screen to which said beam is deflected; and,
   d. circuit means for enlarging the individual visible indications on said screen and reducing the separation between said locations, said circuit means providing cyclic beam deflecting signals to said deflection means whereby the effective amplitudes of said scintillation responsive beam deflecting signals are cyclically altered, said cyclic beam deflecting signals having a waveform including a positive-going peak, a negative-going peak and ramp portions between said peaks having a substantially constant slope.

7. A system as claimed in claim 6 wherein said ramp portions are of substantially longer duration than said peaks.

8. A system for producing an image on a screen of a cathode ray tube including:
   a. first means for intermittently establishing electron beams in the tube;
   b. deflection means for deflecting successive beams to various spaced locations on a screen of the tube;
   c. first circuitry for conditioning said deflection means to deflect a beam to a particular location of a given number of locations on the screen prior to establishment of the beam and during the time said beam is established; and,
   d. second circuitry for conditioning said deflection means to cause said beam to impinge on said screen about said particular location to produce an illuminated spot on the screen which is relatively bright at its center and which is of diminishing intensity proceeding radially from said center, said second circuitry transmitting a voltage waveform to said deflection means characterized by positive-going and negative-going peaks and an intervening ramp portion, said waveform controlling rate of diminishing intensity of the illuminated spot proceeding radially from the center of the spot.

9. A system as claimed in claim 8 wherein said deflection means includes an X-axis beam deflector and a Y-axis beam deflector, said second circuitry transmitting said wave form to each of said deflectors, and wherein the waveforms applied to said deflectors are out of synchronization and nonharmonic with respect to each other but otherwise are substantially the same.

10. A system for producing an image on a screen of a cathode ray tube including:
    a. first means for intermittently establishing electron beams in the tube;

b. deflection means for deflecting successive beams to various spaced locations on a screen of the tube;

c. first circuitry for conditioning said deflection means to deflect a beam to a particular location of a given number of locations on the screen prior to establishment of the beam and during the time said beam is established; and, d. second circuitry for conditioning said deflection means to cause said beam to impinge on said screen about said particular location to produce an illuminated spot on the screen which is relatively bright at its center and which is of diminishing intensity proceeding radially from said center;

e. said second circuitry comprising integrating means for generating a sawtooth wave, and waveforming circuitry coupled to said integrating means, said waveforming circuitry comprising a resistance coupled between said integrating means and an output of said waveforming circuitry and at least one electronic element connected in parallel with said resistance, said electronic element conducting with low resistance when a predetermined voltage is established across said resistance.

11. In a scintillation camera system:

a. an oscilloscope effective to produce visible indications at discrete separate locations on a screen thereof in response to scintillations at corresponding locations in a scintillator;

b. said oscilloscope including means for producing an electron beam, and beam deflection means for directing said beam to said locations, said beam deflection means including a first element for effecting deflection of said beam along an ordinate and a second element for effecting deflection of said beam along an abscissa;

c. scintillation responsive means providing beam deflecting signals to said beam deflection means for controlling the locations on said screen to which said beam is deflected; and, d. circuit means for enlarging the individual visible indications on said screen and reducing the separation between said locations, said circuit means providing cyclic beam deflecting signals to said deflection means whereby the effective amplitudes of said scintillation responsive beam deflecting signals are cyclically altered, one of said scintillation responsive beam deflecting signals and one of said cyclic beam deflecting signals being applied to said first element, and another of said scintillation responsive beam deflecting signals and another of said cyclic beam deflecting signals being applied to said second element, said cyclic beam deflecting signals being nonharmonic with respect to each other.

12. In a scintillation camera system:

a. a scintillation camera for producing first analog signals in response to detection of scintillations in a scintillator of the camera;

b. signal processing circuitry for digitizing said first signals and reconverting said digitized signals to second analog signals;

c. display means responsive to said second analog signals for producing a visual representation of said scintillations comprised of visible indications at discrete locations on a viewing surface, the locations of said indications on said surface being determined by said second analog signals; and, d. smoothing circuit means for superimposing cyclic waveforms on said second analog signals whereby said visual representation is smoothened.

13. The system claimed in claim 12 wherein said display means comprises a cathode ray tube having means for producing a beam and beam deflecting means for deflecting said beam to said locations in response to said second analog signals, and said viewing surface comprises a screen of said cathode ray tube.

* * * * *